July 21, 1970   E. S. BUZZELLI   3,521,131

SOLID STATE SWITCH

Filed March 22, 1968

INVENTOR.
EDWARD S. BUZZELLI

BY
*Leland L. Chapman*

ATTORNEY

United States Patent Office

3,521,131
Patented July 21, 1970

3,521,131
SOLID STATE SWITCH
Edward S. Buzzelli, Solon, Ohio, assignor to The Standard Oil Company, Cleveland, Ohio, a corporation of Ohio
Continuation-in-part of application Ser. No. 656,450, July 27, 1967. This application Mar. 22, 1968, Ser. No. 715,359
Int. Cl. H01g 9/02
U.S. Cl. 317—231                        1 Claim

ABSTRACT OF THE DISCLOSURE

A solid state temperature responsive switch operable in an electrical circuit only in the solid state with alternating current. The switch comprises an enclosure having lithium sulfate between a pair of spaced electrodes. The lithium sulfate becomes conductive at elevated temperatures, but below the melting point. The lithium sulfate is melted and allowed to cool while in contact with the electrodes. The circuit is in closed position from above about 925° F. to just below 1550° F.

---

This is a continuation-in-part of application Ser. No. 656,450 filed July 27, 1967, now abandoned.

This invention relates to a solid state switch comprising a pair of spaced electrodes and lithium sulfate salt disposed between and being in contact with the electrodes. Lithium sulfate is normally a non-conductor of electricity but becomes conducting at elevated temperatures below its melting point.

The prior art is replete with various temperature responsive devices. Of particular interest is the Ovshinsky U.S. Pat. 3,201,736, which discloses a thermistor-type of a temperature responsive device utilizing lithium compounds. In column 3 the patent points out that the lithium compounds can be used to open a load circuit when in their solid state, and to close a load circuit when in their molten condition.

In evaluating a negative temperature resistance coefficient substance for a solid state switch application, one must consider a number of factors. First of all, the candidate substance must have a very high resistance at a temperature near the switching temperature. Since a switch closes or opens a circuit, this requirement is imposed for the reason that the substance must be capable of abruptly and completely blocking the flow of current.

This substance must also exhibit a rapid change in resistance over a small temperature range below its melting point. The greater the ratio of $\Delta R/\Delta T$, the more precise and distinct will be the switching temperature. In the case of lithium sulfate, the resistance drops from 1000 ohms to 1.5 ohms within a temperature span of less than 60° F., for an exceptional $\Delta R/\Delta T$ factor of about 17:1.

The substance must also demonstrate a wide temperature span in the solid conducting region which is above the switching temperature and below the melting point. The conducting region extends below 100 ohms, and preferably below 10 ohms. There are known compounds which manifest a temperature span of 100–150° F. in the solid conducting region between the switching temperature and the respective melting point, yet these compounds are not suitable for solid state switch application for two reasons: (a) long before the melting point of the compound is reached, undesirable pools of liquid form; and (b) for practical applications, a temperature span of 100–150° F. is not sufficient to accommodate the normal temperature surges.

Lastly, the substance must be electrically stable to AC and thermally stable to decomposition caused by thermal cycling.

Lithium sulfate melts at 1580° F. At about 600° F., resistance of lithium sulfate is 10,000 ohms. Between points (500 ohms, 885° F.; 1.5, 925) and points (1.5, 925; 1, 1580), the plot follows a straight-line correlation. The $\Delta R/\Delta T$ factor is an enviable 17:1. At 100 ohms on the plot, the temperature span in the solid state conducting region is a whopping 680° F.; at 10 ohms, it is 670° F; and at 5 ohms, it is 660° F.

The operation of the switch of this invention is made possible by the unique characteristic exhibited by lithium sulfate which ionizes below its melting point and becomes electrically conducting. This transformation of lithium sulfate is complete at a temperature of about 1070° F. At this temperature, lithium sulfate also has the unusual property of transforming from an opaque to a transparent substance, which condition persists up to its melting point.

At an elevated temperature, lithium sulfate undergoes a change from monoclinic crystal structure to cubic. The crystal phase change takes place as ionization is progessing. The result of this change is the precipitation of lithium ions which serve to conduct electricity. Since the lithium ions in the crystal structure of the lithium sulfate are the current carriers, the electrical resistance of the monoclinic lithium sulfate declines as the crystal phase change shifts to cubic form with a consequent increase of lithium ion precipitation. The electrical resistance of lithium sulfate declines logarithmically with increase in temperature. Although the solid state properties of lithium sulfate are here exploited for the purposes of this invention, it is pointed out that lithium sulfate remains electrically conducting even above its melting point, which is about 1580° F.

It is understandable that lithium sulfate may contain impurities which may affect its conductivity. Reagent grade of lithium sulfate has been tested and found to give the expected transition. The response of this substance is somewhat dependent on its physical form. A fused salt will impart a sharper transition from a non-conductive state to conductive than a salt in powdered form.

The bulk of the prior art devices utilize solid materials which undergo a change in phase to a liquid. Since this phase change results in a greatly decreased volume, there is a possibility that contact between the electrodes may be broken with a consequent erroneous indication that the material is in its non-conducting state and therefore, below a certain temperature. Many of these devices use salts, such as LiCl-KCl, which are extremely corrosive and present very difficult sealing problems. Extreme precautionary measures must be undertaken to prevent such salts from leaking out and causing severe damage to related components of the apparatus. Also, the inherent problem of volatilization is always present.

The instant switch is inexpensive and has a reliability near 100 percent. Since it is a solid state device, no corrosion or volatilization problems are encountered, and the volume change is relatively negligible. Should the container encapsulating the salt rupture, the salt will not leak out to corrode and damage the surrounding equipment. This switch is capable of withstanding high currents at normal domestic line voltages thereby obviating the necessity for sensitive relays, which thermocouples and CdS cells require.

Figure 1:
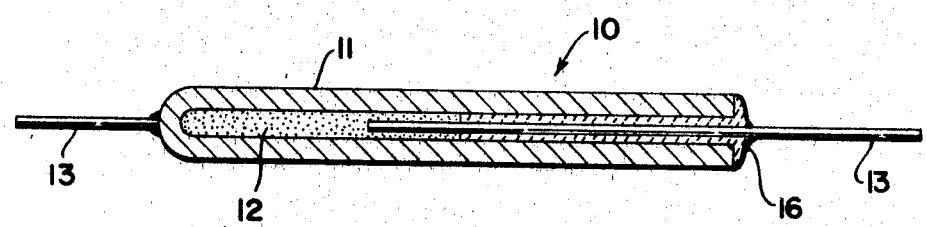
FIG. 1 is a schematic diagram of the herein described temperature responsive device or switch.

The temperature responsive device shown in FIG. 1 includes a cylindrical housing or container 11 which can be made of stainless steel, nickel, iron, glass, etc. Finely ground lithium sulfate salt 12 is packed into container 11 and a couple of conductors 13 protrude into the container from opposite sides. Open end of container 11 is sealed by electrically insulating ceramic cement 16. Instead of packing the powder, it is also possible to melt the salt and allow it to solidify in the container around the conductors. This latter scheme provides an improved contact between the salt and the conductors.

It is fundamental that if such a device is to operate as a switch, the conductors must be insulated from the container. This is accomplished either by providing a container of non-conducting material or simply insulating the conductors from the container in a known manner. As the prior art shows, the container itself may function as a conductor, in which case, only one other conductor would be needed to complete the circuit. FIG. 1 shows one type of switch design. It should be understood that the design of the switch can be varied to suit the particular application.

A number of switches such as shown in FIG. 1, and other types, have been built and tested. It was found that the switching time varied from about five to about fifty seconds. Since the design of a switch determines the rate at which heat can be transmitted to the salt, a switch can be designed to give switching time of less than three seconds. In addition to modifying the design of a switch, metal atoms may be incorporated into the salt to decrease the response time.

The novel switch described herein has a gamut of applications, many of which are mentioned in the prior art. One of the possible applications for this switch is in a fuel oil furnace wherein the switch is placed directly in the flame to sense whether the burner flame is on or off. Since the flame temperature in such a furnace is approximately 1200° F., lithium sulfate is particularly suited for such an application.

Figure 2:
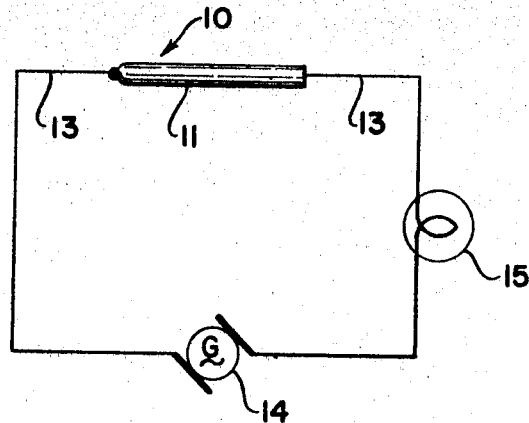
FIG. 2 is a diagram showing the use of the switch in an electrical circuit.

An electrical circuit for a fuel oil furnace application of switch 10 may resemble the one depicted in FIG. 2. Conductors 13 and the ionizable salt 12 form an electrical path in the circuit of FIG. 2, which includes a source of electrical current 14 and a signal mechanism 15. The circuit remains open as long as the salt 12 remains in its nonionized state. When the salt is subjected to a temperature at which it ionizes, the salt becomes a conductor of electricity thereby creating a path for flow of electricity between conductors 13 and permitting the circuit to close. This causes the signal mechanism 15 to operate by, for example, sounding an alarm, flashing a light, operating a valve, and the like.

EXAMPLE I

One-quarter inch diameter stainless steel tubing, approximately two inches in length and 0.08 inch in thickness, with one end cap sealed, was filled with 1 cc. of dry lithium sulfate salt ground to a fine powder. The lithium sulfate was reagent grade, i.e., about 99 percent pure. This material was packed lightly into the tube and a 16-gauge stainless steel rod was concentrically centered in the tube. The open end of the tube was sealed with ceramic cement, and the cement was cured. Two wires were fastened to the switch and a light bulb was added to complete the circuit. A 110 A.C. voltage was impressed across the switch. The ohmic resistance measured at this point was approximately $10^6$ ohms. The switch was then placed over an open flame and heated to an elevated temperature. Upon heating, the resistance of the switch plummeted and the circuit automatically closed, thereby illuminating the light bulb in the circuit. The time lapse between the application of the flame and the illumination of the bulb was twelve seconds. On removing the flame, the circuit reopened. This sequence was repeated through 20,000 cycles at a rate of one per minute without failure of the switch. Switching time varied from nine to forty seconds.

As was earlier pointed out, a switch can be designed to meet the desired specification. For example, a switch of a different design using lithium sulfate had a resistance of less than one ohm. A considerably larger switch withstood a current of 40 amperes at 110 volts without adverse effects. The larger switches which are able to withstand higher currents have switching times up to sixty seconds. Still another switch operated without failure for over 1000 fifteen-minute cycles in an oil furnace. a switch for 70 milliamperes having the dimension of ⅛ inch diameter by ½ inch long, had a switching time of three to five seconds from ambient temperature in the laboratory, and a switching time of about twenty seconds in furnace tests. Cool-down time of the switches varied from five to ten seconds in the laboratory and was about sixty seconds in furnace tests.

It should be understood that the specific embodiments of the switch as set forth herein are presented for purposes of illustration only and should not be construed as otherwise limiting the scope of the present invention.

I claim:
1. A solid state temperature responsive switch for use in an electrical circuit and operable only in the solid state with alternating current comprising an enclosure and disposed within said enclosure a pair of spaced electrodes and a salt consisting of lithium sulfate, said salt being disposed between and in contact with said electrodes, said salt having been fused and deposited on and disposed between the electrodes in the molten state and allowed to solidify while in contact with said electrodes in the assembly of the switch, said lithium sulfate functioning as a conductor of electricity in the solid state at temperatures from about 925° F. to below 1580° F., the electrodes of said switch being connected in an electrical circuit for controlling the current flow therethrough, the circuit remaining in an open position below 925° F. and the circuit being in a closed position from above about 925° F. to just below 1580° F.

References Cited

UNITED STATES PATENTS 3,271,584  9/1966  Ovshinsky _____ 338—25

REUBEN EPSTEIN, Primary Examiner

U.S. Cl. X.R.

174—1; 317—237; 338—25